(12) United States Patent
Yamada

(10) Patent No.: US 11,460,710 B2
(45) Date of Patent: Oct. 4, 2022

(54) OPTICAL ELEMENT AND LASER IRRADIATION DEVICE

(71) Applicant: AYASE CO., LTD., Yokohama (JP)

(72) Inventor: Takatoshi Yamada, Yokohama (JP)

(73) Assignee: AYASE CO., LTD., Yokohama (JP)

( * ) Notice: Subject to any disclaimer, the term of this patent is extended or adjusted under 35 U.S.C. 154(b) by 140 days.

(21) Appl. No.: 16/755,246

(22) PCT Filed: Nov. 9, 2017

(86) PCT No.: PCT/JP2017/040448
§ 371 (c)(1),
(2) Date: Apr. 10, 2020

(87) PCT Pub. No.: WO2019/092833
PCT Pub. Date: May 16, 2019

(65) Prior Publication Data
US 2020/0241309 A1 Jul. 30, 2020

(51) Int. Cl.
*G02B 27/09* (2006.01)
*G02B 19/00* (2006.01)
*G02B 27/30* (2006.01)

(52) U.S. Cl.
CPC ..... *G02B 27/0927* (2013.01); *G02B 27/0955* (2013.01); *G02B 19/0009* (2013.01); *G02B 19/0047* (2013.01); *G02B 27/30* (2013.01)

(58) Field of Classification Search
CPC .... G02B 27/09; G02B 37/30; G02B 27/0927; G02B 27/0955; G02B 19/0009; G02B 19/0052; G02B 19/0047; G02B 19/0014; G02B 3/04; G02B 3/06

USPC ........... 359/718–721, 796, 800; 372/29.014, 372/29.02
See application file for complete search history.

(56) References Cited

U.S. PATENT DOCUMENTS

| | | | |
|---|---|---|---|
| 4,826,299 | A | 5/1989 | Powell |
| 6,072,631 | A | 6/2000 | Guenther et al. |
| 6,201,229 | B1 | 3/2001 | Tawa et al. |
| 2008/0272275 | A1 | 11/2008 | Shklover et al. |
| 2014/0348190 | A1 | 11/2014 | Ito |
| 2017/0082861 | A1 | 3/2017 | Xu et al. |

(Continued)

FOREIGN PATENT DOCUMENTS

| | | |
|---|---|---|
| CN | 104094161 A | 10/2014 |
| JP | 2006-47763 A | 2/2006 |
| JP | 2006-119142 A | 5/2006 |

OTHER PUBLICATIONS

Office Action for corresponding Chinese application No. 2021061802048820 dated Jun. 23, 2021.

(Continued)

*Primary Examiner* — Jie Lei
(74) *Attorney, Agent, or Firm* — ArentFox Schiff LLP; Michael Fainberg

(57) ABSTRACT

Ununiformity of a light intensity of a laser beam is appropriately reduced. An optical element receives a laser beam having a light intensity distribution and provides wavefront aberration of the received laser beam in a first direction orthogonal to a traveling direction larger than a diffraction limit, and provides wavefront aberration of the received laser beam in a second direction orthogonal to the traveling direction and the first direction equal to or smaller than the diffraction limit.

6 Claims, 9 Drawing Sheets

(56) References Cited

U.S. PATENT DOCUMENTS

2017/0115202 A1\* 4/2017 Heanue .............. G01N 15/1459
2017/0299510 A1 10/2017 Acikalin et al.

OTHER PUBLICATIONS

Zernike polynomials—Wikipedia, the free encyclopedia, Aug. 22, 2016 (Aug. 22, 2016), pp. 1-9.

\* cited by examiner

OPTICAL ELEMENT AND LASER IRRADIATION DEVICE

FIELD

The present invention relates to an optical element and a laser irradiation device.

BACKGROUND

A laser beam has distribution in light intensity, and for example, a single-mode laser has a Gaussian profile. In the Gaussian profile, the light intensity is high near the optical axis and decreases as being separated from the optical axis. However, a laser having uniform light intensity is required in some cases, depending on usage. For example, Patent Literature 1 discloses a technology of uniformizing the light intensity of a laser beam having a line shape elongated in one direction by performing top-hat conversion by using a Powell lens. Patent Literature 2 discloses use of a DOE (Diffractive Optical Element). It is possible to uniformize the light intensity of a laser beam by using the DOE.

CITATION LIST

Patent Literature

Patent Literature 1: U.S. Pat. No. 4,826,299
Patent Literature 2: Japanese Translation of PCT International Application Publication No. 2002-520651

SUMMARY

Technical Problem

However, a Powell lens geometric-optically narrows a laser beam, and is not wave-optically designed, in other words, is not designed while taking into account, for example, diffraction of the laser beam. Thus, in a case where diffraction occurs to the laser beam, the light intensity potentially cannot be appropriately uniformized with the Powell lens. Diffraction occurs to the laser beam, for example, when the laser width of a line-shaped laser beam along the line is shorter than the width of a lens. A DOE functions when diffraction occurs, but has a minute structure and thus is difficult to manufacture. The light intensity distribution thereof is easily affected by change in the wavelength of a laser beam. Accordingly, the DOE has room for improvement.

Thus, the present invention is intended to provide an optical element and a laser irradiation device that appropriately reduce ununiformity of the light intensity of a laser beam.

Solution to Problem

To solve the problem above and achieve the objective, the optical element of the present disclosure receives a laser beam having a light intensity distribution and provides wavefront aberration of the received laser beam in a first direction orthogonal to a traveling direction larger than a diffraction limit, and provides wavefront aberration of the received laser beam in a second direction orthogonal to the traveling direction and the first direction equal to or smaller than the diffraction limit.

In the optical element, it is preferable that a difference between maximum and minimum values of the wavefront aberration in the first direction is equal to or larger than a wavelength of the laser beam.

In the optical element, it is preferable that the wavefront aberration of the laser beam in the first direction has a profile continuous in the first direction.

In the optical element, it is preferable that the wavefront aberration of the laser beam in the first direction has a curvature profile, a curvature of which has a local maximum value at a first position and has, at a second position and a third position, values smaller than the local maximum value at the first position, and the first position is a position between the second position and the third position in the first direction and is a position closer to the optical axis of the laser beam than the second position and the third position.

In the optical element, it is preferable configured to emit the laser beam, a length of which in the first direction is shorter than a length of the optical element in the first direction.

It is preferable that the optical element is an aspherical cylindrical lens or an aspherical toric lens.

To solve the problem above and achieve the objective, the laser irradiation device of the present disclosure comprises the optical element and a light source configured to emit the laser beam to the optical element.

Advantageous Effects of Invention

According to the present invention, it is possible to appropriately reduce ununiformity of the light intensity of a laser beam.

DESCRIPTION OF EMBODIMENTS

A preferable embodiment of the present invention will be described below in detail with the accompanying drawings. The present invention is not limited to the present embodiment, and when including a plurality of embodiments, the present invention also includes combinations of the examples.

Figure 1:
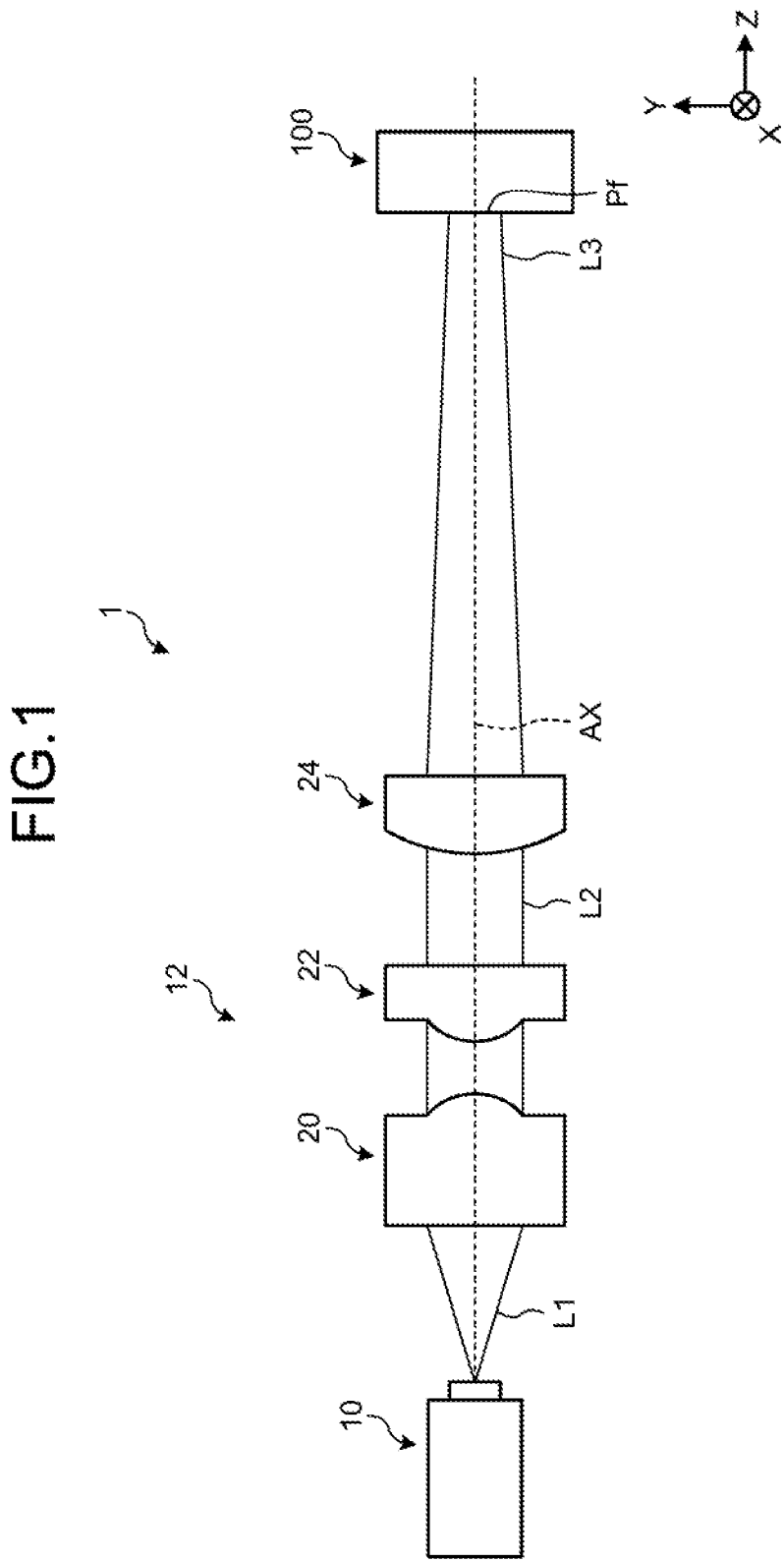
FIG. 1 is a schematic diagram of a laser irradiation device according to the present embodiment.
Figure 2:
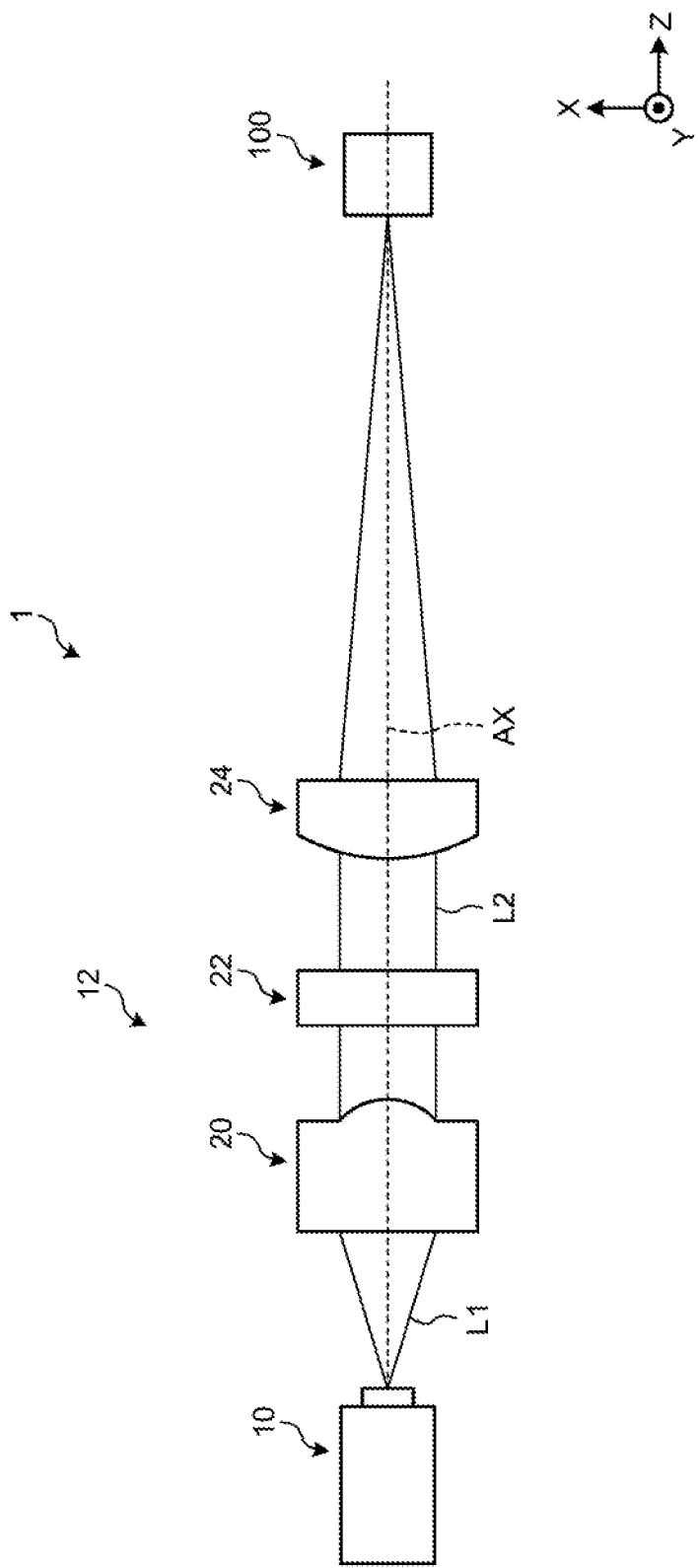
FIG. 2 is a schematic diagram of the laser irradiation device according to the present embodiment.

(Configuration of Laser Irradiation Device)
FIGS. 1 and 2 are schematic diagrams of a laser irradiation device according to the present embodiment. As illustrated in FIG. 1, a laser irradiation device 1 according to the present embodiment includes a light source 10 and an optical element unit 12. The light source 10 generates a laser beam L1 and emits the generated laser beam L1 to the optical element unit 12. The laser beam L1 has a light intensity distribution. In the present embodiment, the laser beam L1 is a single-mode laser beam, and the light intensity distribution thereof is Gaussian distribution. The wavelength of the laser beam L1 is equal to or more than 405 nm and equal to or less than 660 nm but is not limited to the range, and may be any wavelength. The Gaussian distribution is distribution expressed by, for example, Expression (1) below.

$$D(x) \propto \exp\left(-2\left(\frac{x}{\alpha_1}\right)^2\right) \quad (1)$$

In Expression (1), $D(x)$ represents the intensity distribution of a laser beam at a predetermined position in an X direction, and $\alpha_1$ is a coefficient.

Hereinafter, a direction Z is defined to be the traveling direction of the laser beam L1, a direction X is defined to be one direction along a plane orthogonal to the direction Z, and a direction Y is defined to be the other direction along the plane orthogonal to the direction Z. In other words, the direction Y is a first direction orthogonal to the traveling direction of the laser beam L1, and the direction X is a second direction orthogonal to the direction Z and the direction Y. Hereinafter, the central axis, in other words, the optical axis of the laser beam L1 in the direction Z is referred to as an optical axis AX. FIG. 1 is a diagram in which the direction Y points upward in the sheet, and FIG. 2 is a diagram in which the direction X points upward in the sheet.

The optical element unit 12 is a unit including a plurality of optical elements and provided on the direction Z side of the light source 10. In the present embodiment, the optical element unit 12 includes a collimating lens 20, an optical element 22, and a convergence lens 24 as the plurality of optical elements. The collimating lens 20, the optical element 22, and the convergence lens 24 are arranged in the direction Z in the stated order from the light source 10 side.

The collimating lens 20 receives the laser beam L1 emitted from the light source 10, adjusts the received laser beam L1 into parallel light, and emits the adjusted laser beam L1. The laser beam L1 emitted from the light source 10 is divergent light. The collimating lens 20 adjusts the laser beam L1 as divergent light into parallel light and emits the adjusted laser beam L1. The laser beam L1 adjusted into parallel light and emitted from the collimating lens 20 travels in the direction Z and is incident on the optical element 22.

Figure 3:
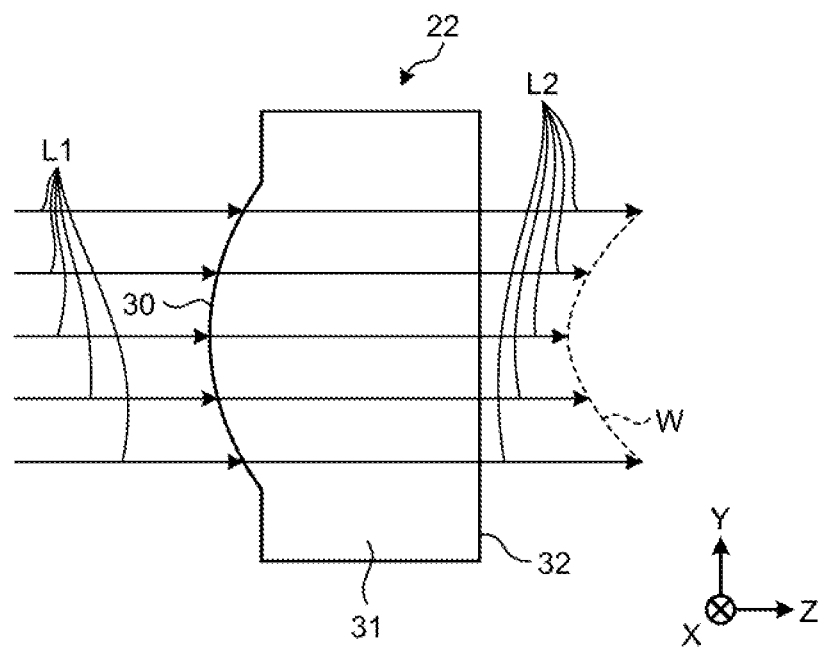
FIG. 3 is a schematic diagram of an optical element according to the present embodiment.

FIG. 3 is a schematic diagram of the optical element according to the present embodiment. As illustrated in FIG. 3, the optical element 22 is a lens and made of, for example, transparent glass or resin. The optical element 22 id sn optical element which provides a predetermined wavefront aberration to the laser beam L1.

The optical element 22 includes an entrance surface 30 and an exit surface 32. The entrance surface 30 is a surface of the optical element 22 on the collimating lens 20 side (the light source 10 side), and the exit surface 32 is a surface of the optical element 22 on the direction Z side. In other words, the exit surface 32 is a surface facing the entrance surface 30 (opposite to the entrance surface 30) in the direction Z.

The laser beam L1 from the collimating lens 20 (light source 10) is incident on the optical element 22 through the entrance surface 30. The laser beam L1 incident through the entrance surface 30 travels through an inside 31 of the optical element 22 and is emitted as a laser beam L2 through the exit surface 32. The laser beam L2 has wavefront aberration having a predetermined profile in the direction Y. The wavefront aberration of the laser beam L2 in the direction Y is larger than the diffraction limit. In addition, the laser beam L2 has wavefront aberration equal to or smaller than the diffraction limit in the direction X. In other words, the optical element 22 emits, as the laser beam L2 through the exit surface 32, the laser beam L1 collimated through the collimating lens 20 and incident through the entrance surface 30. The optical element 22 has a characteristic making the laser beam L2 having the predetermined wavefront aberration in the direction Y and having diffraction limit performance (having wavefront aberration equal to or smaller than diffraction limit performance) in the direction X. The diffraction limit is, in other words, no aberration. No aberration means that the wavefront aberration is equal to or smaller than the Marechal criterion. This indicates that the value of the diffraction limit is the Marechal criterion. The Marechal criterion means that the root-mean-square (rms value) of the wavefront aberration is equal to or smaller than 0.07-times the wavelength of the laser beam L1. Details of wavefront aberration provided by the optical element 22 will be described later. In a case where the laser beam L1 in FIG. 3 is incident on the inside 31 through the entrance surface 30, the phase thereof changes so as to become the laser beam L2 as described above, but the refraction of the laser beam L1 is a negligibly small amount. However, the laser beam L1 incident on the inside 31 through the entrance surface 30 may refract by an amount larger than a negligible amount. The wavelength of the laser beam L2 is still the same as the wavelength of the laser beam L1.

In the present embodiment, the entrance surface 30 of the optical element 22 has an aspherical cylindrical shape. The entrance surface 30 of the optical element 22 has a shape that provides, to the laser beam L2, wavefront aberration in the direction Y larger than the diffraction limit and wavefront aberration in the direction X equal to or smaller than the diffraction limit. The entrance surface 30 has an aspherical curved shape (concave shape) having a locus close to an arc in the direction Y as illustrated in FIG. 1, and has a straight locus in the direction X as illustrated in FIG. 2. In other words, the entrance surface 30 has an aspherical cylindrical shape having an axial direction aligned with the direction X. The exit surface 32 of the optical element 22 has a flat plate shape orthogonal to the direction Z.

In the present embodiment, the entrance surface 30 has a shape that provides, to the laser beam L2, wavefront aberration in the direction Y larger than the diffraction limit and wavefront aberration in the direction X equal to or smaller than the diffraction limit, but the entrance surface 30 is not limited to this shape. Specifically, the entrance surface 30 may have a flat plate shape, and the exit surface 32 may have a shape (for example, an aspherical shape) that provides, to the laser beam L2, wavefront aberration in the direction Y larger than the diffraction limit and wavefront aberration in the direction X equal to or smaller than the diffraction limit. Alternatively, the entrance surface 30 and the exit surface 32 may be both designed to have aspherical shapes, not flat plate shapes, so that, through both surfaces, the laser beam L2 is provided with wavefront aberration larger than the diffraction limit in the direction Y and wavefront aberration equal to or smaller than the diffraction limit in the direction X. In other words, a surface (for example, at least one of the entrance surface 30 and the exit surface 32) of the optical element 22 through which a laser beam transmits needs to have a shape that provides, to the laser beam L2, wavefront aberration larger than the diffraction limit in the direction Y and wavefront aberration equal to or smaller than the diffraction limit in the direction X.

The convergence lens 24 receives the laser beam L2 emitted from the optical element 22. The convergence lens 24 emits the received laser beam L2 as a laser beam L3 with the focal position converged on an irradiation object 100. In other words, the laser beam L3 from the convergence lens 24 is emitted toward the irradiation object 100 at a focal position Pf. The focal position Pf is the beam waist position (position at which the beam radius is minimum) of the laser beam L3. The laser irradiation device 1 has the above-described configuration.

Figure 4:
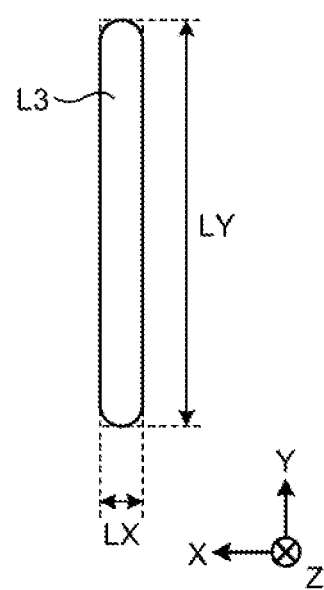
FIG. 4 is a schematic diagram illustrating laser beam intensity distribution when viewed in an optical axis direction.

FIG. 4 is a schematic diagram illustrating laser intensity distribution when viewed in the optical axis direction. FIG. 4 is a schematic diagram of the intensity distribution of the laser beam L3 emitted from the optical element 22 when viewed in the direction Z. FIG. 4 illustrates the intensity distribution of the laser beam L3 at the focal position Pf. As illustrated in FIG. 4, the laser beam L3 at the focal position Pf has a line shape having a length LY in the direction Y longer than a length LX in the direction X. At the focal position, the length of the laser beam L3 in the direction Y is preferably equal to or longer than three-times and equal to or shorter than 90-times the length in the direction X. However, the ratio of the lengths of the laser beam L3 in the directions X and Y is not limited thereto. The length of the laser beam L3 in the direction X is the maximum length of a region in which the light intensity of the laser beam L3 is equal to or larger than a predetermined value (for example, a region in which the light intensity is equal to or larger than 1/2-times the intensity on the optical axis) in the direction X. Similarly, the length of the laser beam L3 in the direction Y is the maximum length of a region in which the light intensity of the laser beam L3 is equal to or larger than a predetermined value (for example, a region in which the intensity is equal to or larger than 1/2-times the intensity on the optical axis) in the direction Y.

The length LX is shorter than the lengths of the optical element 22 and the convergence lens 24 in the direction X (the length of the exit pupil in the direction X), and the length LY is shorter than the lengths of the optical element 22 and the convergence lens 24 in the direction Y (the length of the exit pupil in the direction Y). In other words, the laser beam L2 is narrowed in both of the direction X and the direction Y by the convergence lens 24. The position of the exit pupil in the present embodiment is at the exit surface of the convergence lens 24. However, the laser beam L2 does not need to be narrowed in the direction Y. The laser beam L3 does not necessarily need to have a line shape.

The laser beam L2 emitted from the convergence lens 24 in this manner is irradiated as the laser beam L3 to the irradiation object 100. The irradiation object 100 is optional, depending on usage of the laser irradiation device 1. For example, in a case where the laser irradiation device 1 is used for a flow site meter, the irradiation object 100 is a sample (cell). In this case, the laser irradiation device 1 emits the laser beam L3 so that the direction X is aligned with the vertical direction. In other words, the laser beam L3 has a shape short in the vertical direction and long in the horizontal direction. Then, the irradiation object 100 (cell sample to which fluorescence material is added) dropped from above in the vertical direction is irradiated with the laser beam L2 having a shape short in the vertical direction and long in the horizontal direction. The flow site meter measures scattered light of the laser beam L2 due to the fluorescence material in the sample and executes measurement. However, the usage of the laser irradiation device 1 is not limited to the flow site meter but is optional.

(Top-Hat Conversion)

The laser beam L1 from the light source 10 has predetermined light intensity distribution (in this example, the Gaussian distribution), and has light intensity ununiform between positions. It is required to make the light intensity distribution of the laser beam L2 in the direction Y uniform through top-hat conversion in some cases.

For example, in illumination usage, a conventional top-hat conversion technology performs the top-hat conversion by transmitting illumination light through an element such as a diffusion plate in an illumination optical system. However, in this case, etendue increases and it is not possible to narrow a laser beam, and noise increases by generating speckle. The etendue is the product of the light emission area and the spread angle of light. In illumination usage, speckle generation causes problems, in particular. In addition, in the field of laser fabrication or the like, the use of a diffusion plate prevents narrowing, which leads to reduced fabrication efficiency.

In the field of shape measurement or the like, a laser beam is used in a line shape in some cases. In such a case, it is required to uniformize as much as possible the intensity of the laser beam in a direction along the line of the laser beam, in other words, the direction Y in the example of FIG. 4 in some cases. In addition, it is required to maintain the diffraction limit, in other words, maintain the Gaussian profile in the width direction of the laser beam (direction across the line of the laser beam), in other words, the direction X in the example of FIG. 4 in some cases. In addition, it is required to reduce noises such as speckles not to hinder uniformization of the intensity of the laser beam in the direction Y and maintenance of the diffraction limit in the direction X in some cases. Conventionally, for example, a Powell lens has been used to meet such requests.

The Powell lens is a lens having one surface in a special cylindrical surface shape, and can meet the above-described requests. However, the Powell lens suffers limitation in polishing fabrication, and thus has a problem that uniformity of illuminance distribution is not zero. To solve this problem, the lens is made to have a high-order aspherical shape in some cases, but such a high-order aspherical shape cannot be generated by polishing. To achieve the high-order aspherical shape, the lens needs to be manufactured by glass or plastic molding using a mold fabricated by grinding. Grinding requires a larger device scale than polishing and needs a process such as evaluation of mold fabrication shaping. Thus, in forming the high-order aspherical shape, manufacturing is more difficult and cost is higher than a case of a normal Powell lens. The uniformity is an evaluation amount indicating how much illuminance distribution is uniform, and is expressed based on, for example, Expression (2) below.

$$U = (L_{max} - L_{min})/(L_{max} + L_{min}) \quad (2)$$

In Expression (2), U represents the uniformity, $L_{max}$ represents the maximum value of illuminance, and $L_{min}$ represents the minimum value of illuminance. Thus, in the example of Expression (2), the uniformity is given by dividing the difference between the maximum and minimum values of illuminance by the sum of the maximum and minimum values of illuminance.

In addition, the top-hat conversion using a conventional Powell lens or aspherical lens is designed based on a geometric-optical reference. In the designing based on the geometric-optical reference, light is regarded as a bundle of straight lines pointing in the traveling direction. The surface shape of the lens is designed so that optical energy is transferred along the straight lines and the optical energy passing through the unit area of a focal plane is uniform. However, for example, in a case where a laser beam of which line width (in the example of FIG. 4, length in the direction X) and line length (in the example of FIG. 4, length in the direction Y) are short is generated, the top-hat conversion is potentially not appropriately performed with the designing based on the geometric-optical reference. Specifically, the line width of light cannot be reduced without limit but has a lower limit based on the diffraction limit relation. In the following, the wavelength of light is denoted by $\lambda$, the half value of the line width is denoted by $w_0$, and a narrowing half angle is denoted by $\theta$. The half value of the line width is the distance from the optical axis where the intensity is $1/e^2$ when the light intensity on the optical axis is taken to be one. In this case, the wavelength $\lambda$, the half width $w_0$, and the narrowing half angle $\theta$ are related as in Expression (3) below. Expression (3) indicates that the narrowing half angle $\theta$ needs to be increased to reduce the line width when the wavelength $\lambda$ is set.

$$w_0 \approx \frac{\lambda}{\pi\theta} \quad (3)$$

In addition, the diameter of the exit pupil is denoted by $\phi$, and the distance from the exit of the optical system to a position at which light in a line shape is generated is denoted by WD. In this case, the narrowing half angle $\theta$, the exit pupil diameter $\phi$, and the distance WD are related as in Expression (4) below.

$$(\phi)/(2WD) > \theta \quad (4)$$

Expression (4) indicates that the exit pupil diameter $\phi$ needs to be increased to increase the distance WD. For example, when the wavelength $\lambda$ is 488 nm, the half width $w_0$ is 5 µm, and the distance WD is 30 mm, the exit pupil diameter $\phi$ needs to be equal to or larger than 1.86 mm. In this case, when the line length of light is set to be 0.1 mm, the line length is shorter than the exit pupil diameter $\phi$, and light is narrowed also in the line length direction. In such a case, the wave property of light such as diffraction needs to be taken into consideration. However, the lens designing based on the geometric-optical reference does not consider light diffraction. Thus, in the top-hat conversion using the conventional Powell lens or aspherical lens, light distribution potentially cannot be appropriately controlled due to diffraction. In addition, the Powell lens or the like is based on an assumption that light emitted from the exit pupil travels while spreading. Thus, in this case, no focal position exists in a direction along the line length of light, and the light is in a Fresnel region. The Fresnel region is a region in which a value calculated by Fraunhofer diffraction does not match with the actual light intensity. Thus, light from the Powell lens expands in the process of propagation of light phase and fluctuation due to a minute flaw or a foreign object on the lens surface. This affects the uniformity and potentially causes a manufacturing defect or the like.

In this manner, the Powell lens or the like does not consider light diffraction, and thus the top-hat conversion potentially cannot be appropriately performed.

When diffraction is taken into consideration, a DOE (Diffractive Optical Element) is used in a disclosed technology. The DOE is, for example, an element having a shape in which the surface is provided with a plurality of steps each having a height approximately equal to the light wavelength. When the DOE is used, the size of the focal plane can be determined with less influence of the size of the exit pupil, and the freedom of designing is higher than the case of the Powell lens. For example, when the DOE is used, optional light intensity distribution can be designed, and a surface tilted relative to the optical axis or a curved surface can be designed. In addition, light, when the DOE is used, is in a Fraunhofer region and thus unlikely to be affected by a flaw or a foreign object unlike the Powell lens. The Fraunhofer region is a region in which the value calculated by Fraunhofer diffraction matches with the actual light intensity.

However, manufacturing of the DOE needs, for example, minute fabrication at 1 µm or smaller and also needs evaluation of the fabrication, and thus the fabrication and evaluation are difficult to perform. Thus, the manufacturing cost of the DOE is high. In addition, the illuminance distribution of the DOE is sensitive to change in the wavelength of light, and thus unnecessary diffracted light cannot be eliminated. When unnecessary diffracted light cannot be eliminated, high use efficiency of light potentially cannot be achieved and speckles are potentially generated. In particular, the fabrication needs patterning or fast etching, and the evaluation needs measurement of steps in the units of nanometers, which leads to a large device scale and high cost.

In the Fraunhofer region, the pupil and the focal plane are coupled with each other by Fourier transform, and this coupling is used by a disclosed technology (refer to U.S. Patent No. 20160266393). In this technology, distribution at the pupil surface for achieving uniform intensity distribution at the focal plane is calculated, and the surface of an optical element is designed based on the calculated distribution. In this case, the surface of the optical element is smooth, and thus the problem with the DOE is solved. However, a plurality of aspherical optical elements are needed to have a space for inverse Fourier transform, and in addition, a propagation distance for obtaining necessary phase inversion and a narrowing lens are needed. Moreover, adjustment is difficult as compared to a case of a single optical element.

In this manner, when the DOE is used, the top-hat conversion is possible with diffraction taken into consideration, but has manufacturing and performance problems. In addition, a simpler structure is required in a technology using Fourier transform. Thus, a technology that allows easier manufacturing and can perform the top-hat conversion when diffraction is taken into consideration is required.

Thus, the inventor has thought that the light intensity distribution of the laser beam L2 in the direction Y can be uniformized by performing the top-hat conversion by providing wavefront aberration in the direction Y to the laser beam L2 with the optical element 22. Specifically, a laser beam having the Gaussian distribution can be formed into a line shape by providing astigmatism to the laser beam, but in this case, the light intensity distribution of the laser beam has the Gaussian distribution and is ununiform in the direction Y. Thus, the inventor has thought of, for example, providing wavefront aberration in addition to the astigmatism.

(Wavefront Aberration)

Wavefront aberration is the shift (aberration) of a wavefront of light (in this example, the laser beam L2) from an ideal wavefront as a reference. The wavefront is a surface (surface orthogonal to a light beam) connecting points of the light beam (in this example, the laser beam L2) in the same phase, and is Wavefront W in the example of FIG. 3. In this example, the ideal wavefront is a wavefront of parallel light and thus has a flat plate shape. Thus, the wavefront aberration in the present embodiment is the shift from a wavefront having a flat plate shape. The wavefront aberration is derived from the phase of light and thus is aberration with the diffraction of light taken into account.

Figure 5:
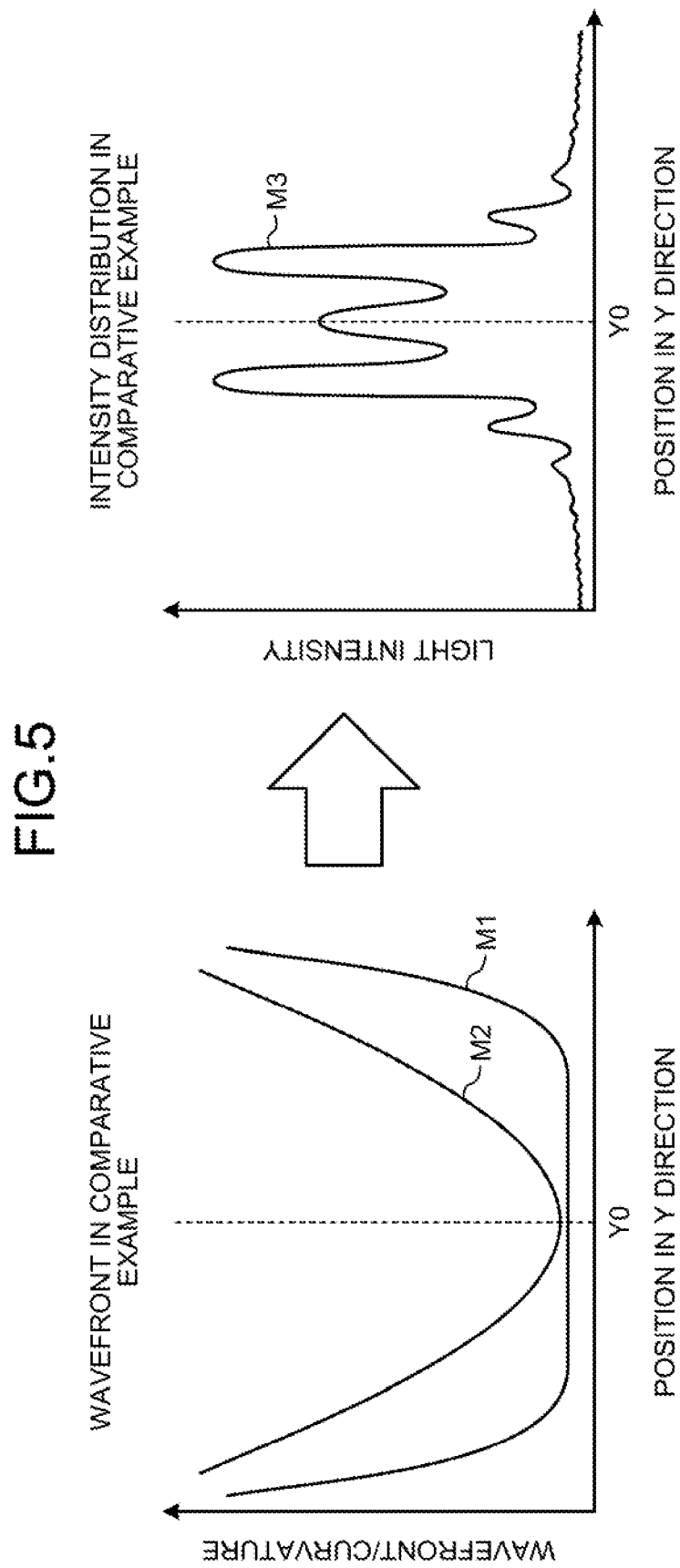
FIG. 5 is an explanatory diagram for describing a wavefront in a comparative example.

Before description of the wavefront aberration provided in the present embodiment, the following describes a wavefront when typical spherical aberration occurs. The spherical aberration occurs in a spherical lens or the like. FIG. 5 is an explanatory diagram for describing a wavefront in a comparative example. FIG. 5 illustrates an exemplary wavefront profile when spherical aberration due to a spherical lens occurs. The horizontal axis of a graph on the left side in FIG. 5 indicates the position in the direction Y. Curve M1 in the graph on the left side in FIG. 5 illustrates an exemplary profile of the wavefront of a laser beam in the direction Y when spherical aberration is provided. As illustrated with Curve M1, the wavefront when spherical aberration as in the comparative example occurs has a constant small value as being separated from Position Y0 on the optical axis AX and starts increasing at separation beyond a predetermined position. Curve M2 illustrates the profile of the wavefront curvature of Curve M1 in the direction Y. As illustrated with Curve M2, the wavefront curvature when spherical aberration occurs is minimum at Position Y0 on the optical axis AX and increases as being separated from Position Y0. In other words, the wavefront curvature of a laser beam in this case decreases near Position Y0 on the optical axis AX and increases in its periphery.

The curvature is an amount indicating the degree of curve of a curved line or a curved surface, and is the reciprocal of a curvature radius. The curvature radius is the radius of a circle approximating the degree of local curve of a curved line or a curved surface. Accordingly, the curvature radius of the wavefront (wavefront aberration) is the radius of a circle approximating the degree of local curve of the profile of the wavefront, and the curvature of the wavefront is the reciprocal of the curvature radius. In the following, $\tau(y)$ represents the profile of the wavefront of a laser beam in the direction Y, and $\rho(y)$ represents the profile of the curvature of $\tau(y)$ in the direction Y. In this case, $\rho(y)$ as the curvature of the wavefront is expressed in, for example, Expression (5) below.

$$\rho(y) = \frac{\frac{d^2\tau(y)}{dy^2}}{\left\{1 + \left(\frac{d\tau(y)}{dy}\right)^2\right\}^{3/2}} \quad (5)$$

In the expression, $\tau(y)$ represents the wavefront, and the magnitude thereof is in the order of the wavelength of the laser beam L2. In addition, y represents the position in the direction Y, and the magnitude thereof is in the order of millimeters. Accordingly, the first-order differential of $\tau(y)$ is small value. Thus, Expression (5) of $\tau(y)$ can be rewritten as Expression (6) below.

$$\rho(y) \approx \frac{d^2\tau(y)}{dy^2} \quad (6)$$

In a case of a normal lens, aberration decreases near the optical axis. As illustrated with, for example, Curve M2, the curvature of the wavefront of a laser beam having transmitted through the lens typically has a minimum value near the optical axis and increases as being separated from the optical axis. When the aberration is large, the phase shift of the laser beam is large. Thus, as illustrated with, for example, the profile of Curve M1 near Position Y0, the normal lens is designed to have a larger region in which the aberration is reduced. However, in such a case, the light intensity distribution of the laser beam cannot be made uniform in some cases. For example, Curve M3 in a graph on the right side in FIG. 5 illustrates the light intensity distribution of a laser beam having a wavefront as illustrated with Curve M1 at the focal position. As illustrated with Curve M3, the light intensity distribution of a laser beam having a wavefront as illustrated with Curve M1 is ununiform in the direction Y.

Thus, the inventor has thought of reducing the ununiformity of the light intensity of the laser beam in the direction Y by intentionally providing wavefront aberration. Specifically, the optical element 22 in the present embodiment provides wavefront aberration to the laser beam L2 to obtain a wavefront that reduces the ununiformity of the intensity distribution in the direction Y. The following describes such a wavefront that reduces the ununiformity of the intensity distribution in the direction Y.

Figure 6:
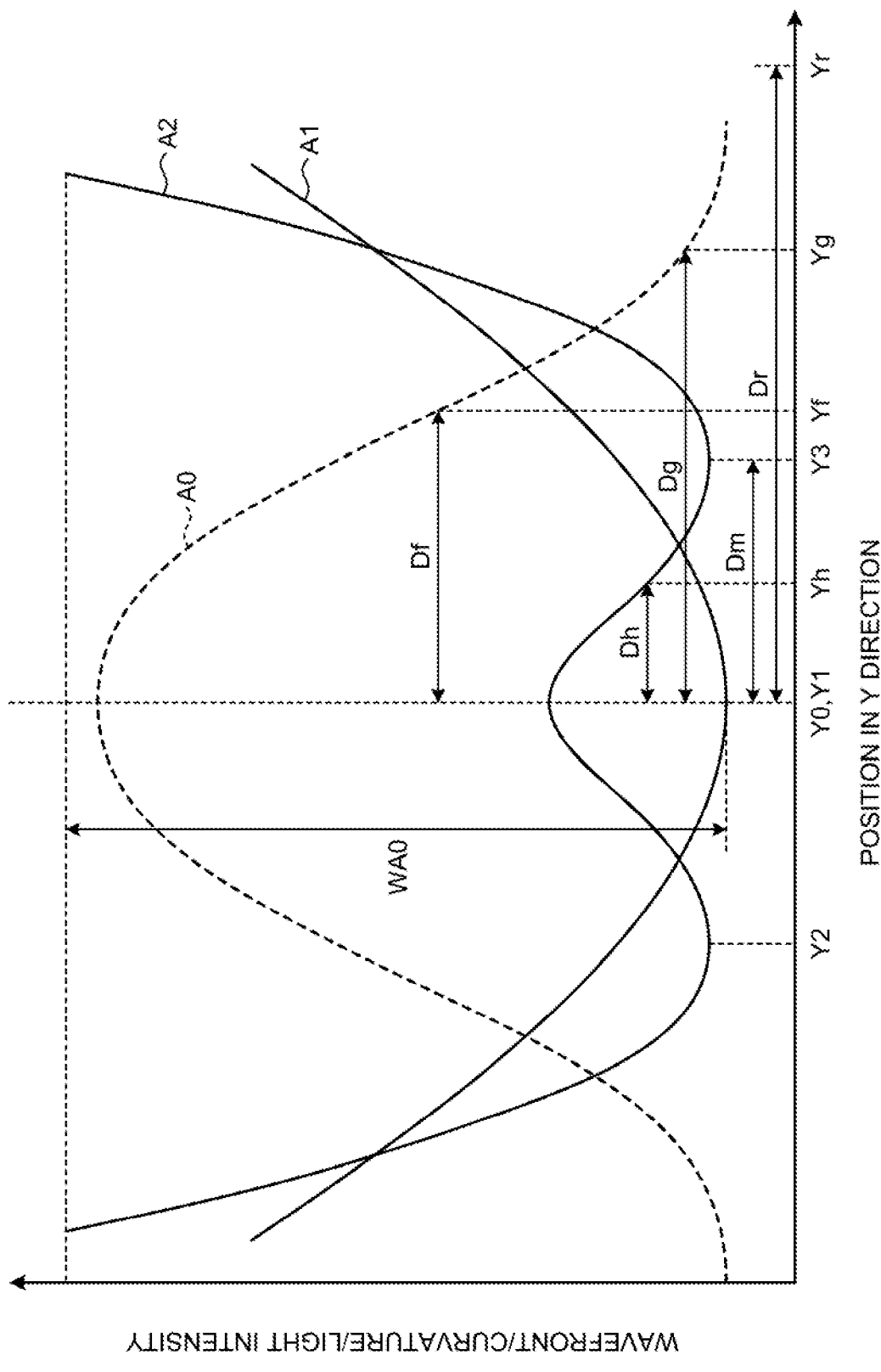
FIG. 6 is an explanatory diagram for describing a wavefront in the present embodiment.

FIG. 6 is an explanatory diagram for describing a wavefront in the present embodiment. Curve A1 in FIG. 6 illustrates an exemplary profile of the wavefront of the laser beam L2 in the direction Y, the laser beam L2 being provided with wavefront aberration in the direction Y by the optical element 22. Curve A2 illustrates the curvature profile of the wavefront of the laser beam L2 in the direction Y, the laser beam L2 being provided with wavefront aberration in the direction Y by the optical element 22. Curve A0 illustrates the light intensity distribution of the laser beam L2 on the exit pupil (in this example, on the exit surface of the convergence lens 24). On the exit pupil, the laser beam L2 is already provided with the wavefront aberration, but the light intensity distribution thereof has not changed to become uniform but still has the Gaussian distribution. Thus, in the light intensity distribution of the laser beam L2 on the exit pupil, the light intensity has a maximum value at Position Y0 on the optical axis AX and is smaller as being separated from Position Y0.

The profile of the wavefront aberration of the laser beam L2 in the present embodiment is obtained by subtracting the profile of an ideal wavefront having a flat plate shape, in other words a constant value, from the profile of the laser beam L2. Thus, the profile of the wavefront of the laser beam L2 illustrated with Curve A1 can be regarded as the profile of the wavefront aberration of the laser beam L2. As illustrated with Curve A1, the wavefront (wavefront aberration) of the laser beam L2 has a local minimum value at Position Y0 on the optical axis AX, and thus is smaller than at other positions in the direction Y. The wavefront (wavefront aberration) of the laser beam L2 becomes larger as being separated from Position Y0. The wavefront profile of the laser beam L2 has a line symmetric shape with respect to the optical axis AX. The profile of the wavefront (wavefront aberration) of the laser beam L2 is continuous and differentiable in the direction Y. A value WA0 as the difference between the minimum and maximum values of the wavefront (wavefront aberration) of the laser beam L2 is equal to or larger than the wavelength of the laser beam L2.

As illustrated with Curve A2, in the curvature profile of the wavefront (wavefront aberration) of the laser beam L2, the value of the curvature of the wavefront (wavefront aberration) near the optical axis AX, more specifically on the optical axis AX, is larger than the value at a position further separated from the optical axis AX. The curvature of the wavefront (wavefront aberration) is smoothly continuous and differentiable in a Y direction. The curvature profile of the wavefront (wavefront aberration) of the laser beam L2 has a line symmetric shape with respect to the optical axis AX, but is not limited thereto. As illustrated in FIG. 6, First Position Y1 is a position between Second Position Y2 and Third Position Y3 in the direction Y. First Position Y1 is closer to the optical axis AX (in other words, Position Y0) than Second Position Y2 and Third Position Y3. In the present embodiment, First Position Y1 is at Position Y0, in other words, on the optical axis AX, and Second Position Y2 and Third Position Y3 are at an equal distance from First Position Y1. In this case, as illustrated with Curve A2, the curvature of the wavefront (wavefront aberration) of the laser beam L2 is upwardly convex and has a peak value (local maximum value) at First Position Y1 (in this example, Position Y0), and is smaller as being separated from First Position Y1. In addition, at Second Position Y2 and Third Position Y3, the curvature of the wavefront has a value smaller than the value at First Position Y1, and is downwardly convex and has a peak value (local minimum value). In other words, the curvature profile of the wavefront of the laser beam L2 has a peak value (local maximum value) at First Position Y1, and the value decreases toward Second Position Y2 and Third Position Y3 as being separated from First Position Y1. The value of the curvature profile of the wavefront increases from Second Position Y2 and Third Position Y3 as further being separated from First Position Y1. In this manner, the value of the curvature of the wavefront of the laser beam L2 near the optical axis AX is larger than the value in its periphery. In the present embodiment, First Position Y1 is on the optical axis AX, but does not need to be on the optical axis AX and can be closer to the optical axis AX than Second Position Y2 and Third Position Y3. With a wavefront profile having a curvature of Curve A2 having such a characteristic, it is possible to uniformize the light intensity in the direction Y.

In the light intensity distribution (Curve A0) of the laser beam L2 on the exit pupil, Position Yg refers to a position at which the light intensity is $1/e^2$ times larger than the light intensity at Position Y0. Length Dg refers to the length from Position Y0 to Position Yg in the direction Y. Length Dm refers to the length from Position Y0 to Third Position Y3 in the direction Y. Position Yh refers to such a position between Position Y0 (First Position Y1) and Third Position Y3 that the curvature at Position Yh is equal to the average value of the curvature at Position Y0 (First Position Y1) and the curvature at Third Position Y3. Length Dh refers to the length from Position Y0 (First Position Y1) to Position Yh. Here, third Position Y3 is a position other than Position Y0 at which the curvature has a peak value (extreme value) and is nearest to Position Y0 (the optical axis AX). In this case, in the curvature of the wavefront of the laser beam L2, Length Dh is desirably shorter than Length Dg.

In the light intensity distribution (Curve A0) of the laser beam L2 on the exit pupil, Position Yf refers to a position at which the light intensity is 1/2 times larger than the light intensity at Position Y0. Length Df refers to the length from Position Y0 to Position Yf. Position Yr refers to the position of the exit pupil, in other words, the positions of end parts of the optical element 22 and the convergence lens 24 in the direction Y. Length Dr refers to the length from Position Y0 to Position Yr. In this case, Length Df is the length of the laser beam L2 in the direction Y at the position of the exit pupil. Length Dr is the length from the center of each of the optical element 22 and the convergence lens 24 to the end part thereof, in other words, the radius thereof. In this case, Length Df is preferably shorter than Length Dr. The relation between Length Df and Length Dr means that the laser beam L2 is narrowed in the direction Y so that Length Df of a region in the direction Y in which the intensity of the laser beam L2 is equal to or larger than 1/2 is shorter than Length Dr of the exit pupil.

Figure 7:
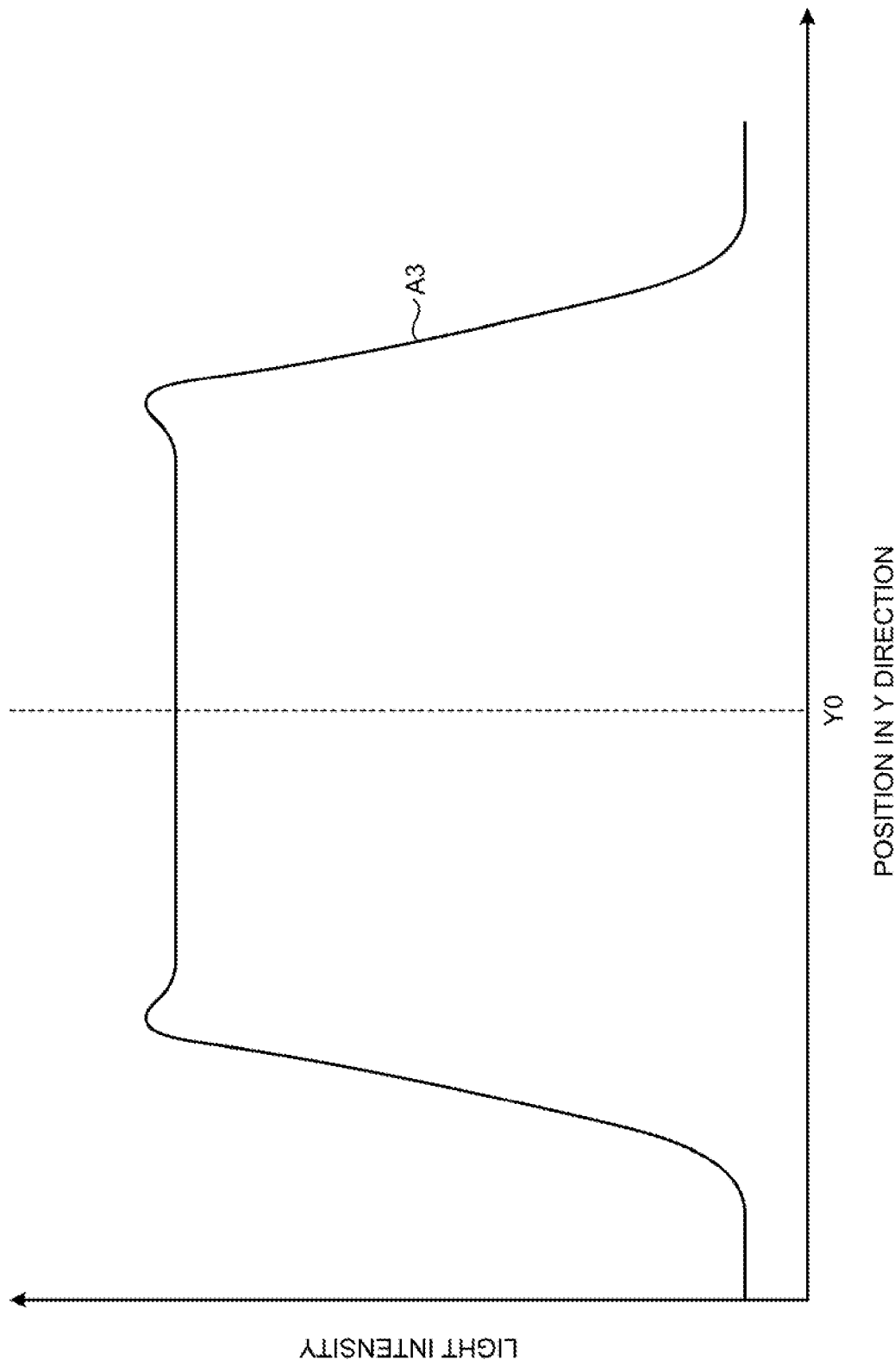
FIG. 7 is a diagram illustrating exemplary laser light intensity distribution according to the present embodiment.

The optical element 22 provides wavefront aberration in the direction Y the laser beam L2 so that the wavefront profile of the laser beam L2 draws Curve A1, in other words, so that the curvature of the wavefront profile of the laser beam L2 draws Curve A2. The optical element 22 provides the wavefront aberration in this manner to prevent the light intensity distribution of the laser beam L2 in the direction Y from becoming ununiform. FIG. 7 is a diagram illustrating exemplary laser light intensity distribution according to the present embodiment. Curve A3 in FIG. 7 illustrates exemplary light intensity distribution of the laser beam L2 in the direction Y when wavefront aberration is provided to the laser beam L2 so that the wavefront profile of the laser beam L2 has a characteristic illustrated with Curve A1. Curve A3 illustrates the light intensity distribution of the laser beam L2 at the focal position. As illustrated with Curve A3, nonuniformity of the light intensity distribution of the laser beam L2 in the direction Y has reduced at the focal position. In other words, at the focal position, the light intensity distribution of the laser beam L2 in the direction Y is more uniform than the light intensity distribution of the laser beam L1 and laser light intensity distribution according to the comparative example (refer to Curve M3 in FIG. 5).

Figure 8:
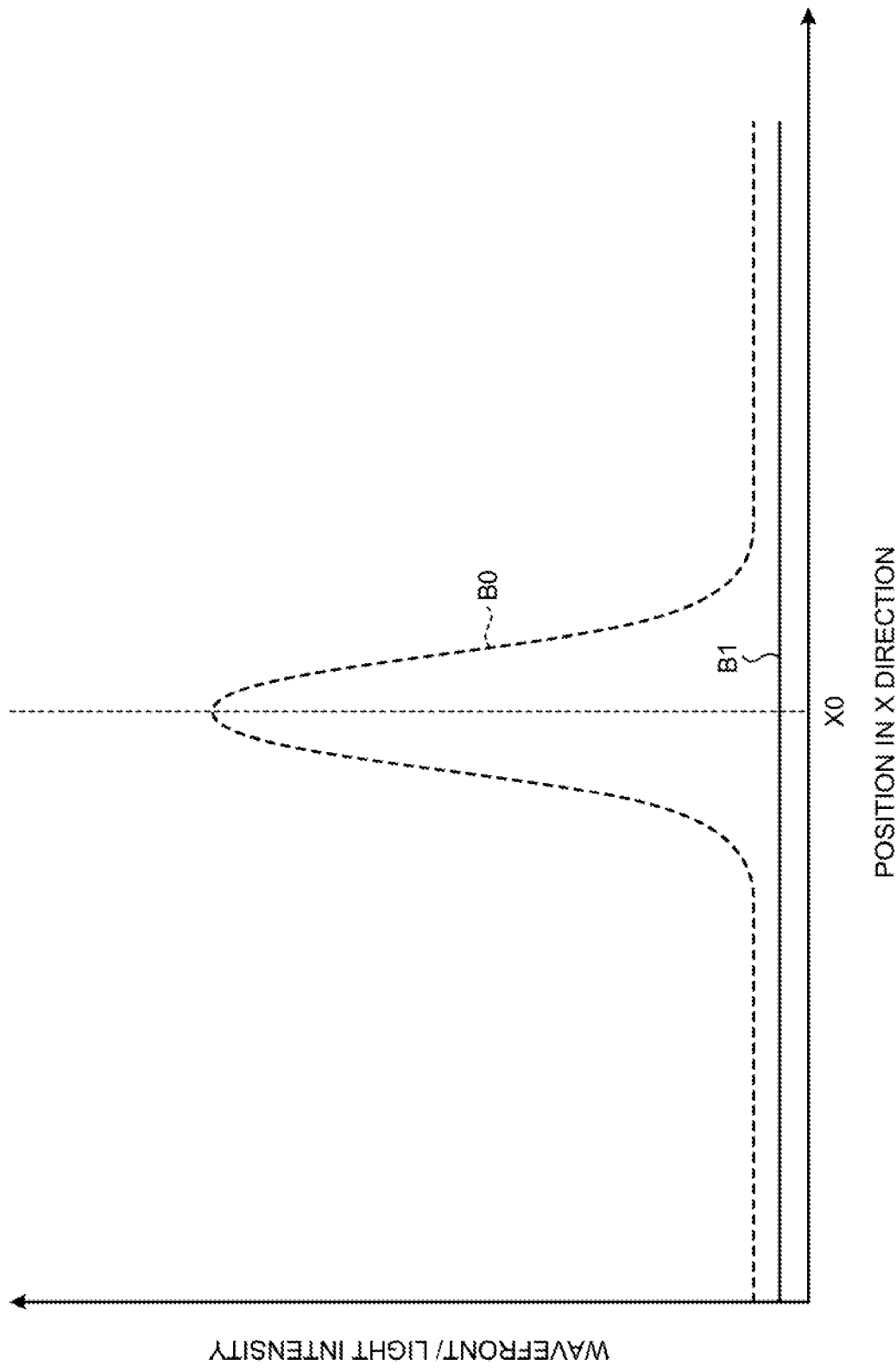
FIG. 8 is a diagram illustrating a wavefront and laser light intensity distribution in a direction X.

The optical element 22 provides wavefront aberration in the direction Y to the laser beam L2 in this manner, but provides no wavefront aberration in the direction X as described above (no aberration). FIG. 8 is a diagram illustrating the wavefront and the laser light intensity distribution in the direction X. In FIG. 8, the horizontal axis is a position in the direction X, and Position X0 is a position on the optical axis AX in the direction X. Curve B1 illustrates the wavefront (wavefront aberration) of the laser beam L2 when no aberration is achieved in the direction X by the optical element 22. As illustrated with Curve B1, the wavefront (wavefront aberration) of the laser beam L2 in the direction X is constant in the direction X and has a small value (value equal to or smaller than the Marechal criterion) at all positions in the direction X. Curve B0 illustrates the light intensity distribution of the laser beam L2 in the direction X at the focal position. In the present embodiment, the laser beam L2 is provided with no wavefront aberration in the direction X but is more narrowed than in the direction Y. Thus, the width of the light intensity distribution of the laser beam L2 in the direction X is smaller than that of the Gaussian distribution, which is the same as the light intensity distribution of the laser beam L1, by a narrowed amount.

In this manner, the optical element 22 emits the laser beam L2 with wavefront aberration in the direction Y but no aberration in the direction X. A surface (in the present embodiment, the entrance surface 30) for providing wavefront aberration having such tendency to the laser beam L2 has, for example, a shape that satisfies Expression (7) below.

$$z=\tau(y)/(1-n) \qquad (7)$$

In the expression, z represents the surface coordinate of the entrance surface 30 in the direction Z, τ(y) represents the wavefront (wavefront aberration) of the laser beam L2 at a predetermined position y in the direction Y, and n represents the refractive index of the optical element 22 at the wavelength of the laser beam L1 (laser beam L2). Accordingly, Expression (7) expresses a profile indicating the surface coordinate of the entrance surface 30 in the direction Z at each position in the direction Y. The surface coordinate of the entrance surface 30 in the direction Z is constant in the direction X. In a case where the entrance surface 30 has such a surface shape, the optical element 22 can provide wavefront aberration in the direction Y but no aberration in the direction X to the laser beam L2 emitted through the exit surface 32. However, the surface shape of the entrance surface 30 defined by Expression (7) is exemplary. The surface shape of the entrance surface 30 may be any shape that provides wavefront aberration in the direction Y but no aberration in the direction X. The surface shape of the entrance surface 30 that provides wavefront aberration in the direction Y but no aberration in the direction X is not unambiguously determined but may be determined by using a non-linear optimization method such as a DLS (Dumped Least Square) method. Thus, sometimes, a plurality of surface shapes are found for providing wavefront aberration having such a tendency to the laser beam L2.

As described above, the optical element 22 according to the present embodiment receives the laser beam L1 having predetermined light intensity distribution. Then, the optical element 22 provides, to the received laser beam L1, wavefront aberration in the direction Y (first direction) orthogonal to the direction Z larger than the diffraction limit. The optical element 22 provides, to the received laser beam L1, wavefront aberration in the direction X (second direction) orthogonal to the direction Z and the direction Y equal to or smaller than the diffraction limit.

The ununiformity of the light intensity distribution of the laser beam L2 in the direction Y at the focal position is required to be reduced in some cases. The optical element 22 according to the present embodiment provides, to the laser beam L2, a predetermined wavefront aberration in the direction Y larger than the diffraction limit and wavefront aberration in the direction X equal to or smaller than the diffraction limit, and emits the laser beam L2 in this state. The optical element 22 can reduce the ununiformity of the light intensity distribution of the laser beam L2 at the focal position by providing wavefront aberration in the direction Y to the laser beam L2.

The optical element 22 provides wavefront aberration to the laser beam L2 so that the difference between the maximum and minimum values of the wavefront aberration (wavefront) in the direction Y is equal to or larger than the wavelength of the laser beam L2. The optical element 22 can more excellently reduce the ununiformity of the light intensity distribution of the laser beam L2 by enlarging the wavefront aberration in the direction Y in this manner.

The optical element 22 provides wavefront aberration to the laser beam L2 so that the profile of the wavefront aberration (wavefront) of the laser beam L2 in the direction Y is continuous in the direction Y. The optical element 22 makes continuous (smoothens) the profile of the wavefront of the laser beam L2 in the direction Y, and thus the surface of a lens that achieves such a wavefront can have a simple shape that is continuous and differentiable while the ununiformity of the light intensity distribution of the laser beam L2 in the direction Y is reduced.

The optical element 22 provides wavefront aberration to the laser beam L2 so that, in the curvature profile of the wavefront aberration (wavefront) of the laser beam L2 in the direction Y, the curvature has a local maximum value at First Position Y1 and has, at Second Position Y2 and Third Position Y3, values smaller than the local maximum value at First Position Y1. First Position Y1 is a position between Second Position Y2 and Third Position Y3 in the direction Y and closer to the optical axis AX of the laser beam L2 than Second Position Y2 and Third Position Y3. The optical element 22 can more excellently reduce the ununiformity of the light intensity distribution of the laser beam L2 by enlarging the curvature of the wavefront at a position close to the optical axis AX in this manner.

The optical element 22 emits the laser beam L2, the length of which in the direction Y is shorter than the length of the optical element 22 in the direction Y. The laser beam L2 emitted from the optical element 22 is narrowed in the direction Y. In this case, influence of diffraction on the laser beam L2 is significant. The optical element 22 provides, to the laser beam L2, wavefront aberration with the influence of diffraction taken into account. Thus, the optical element 22 can excellently reduce the ununiformity of the light intensity distribution of the laser beam L2 when the laser beam L2 is narrowed. The length of the laser beam L2 in the direction Y is longer than the length thereof in the direction X. Thus, the optical element 22 provides, to the laser beam L2 having a line shape, wavefront aberration in the direction Y as the longitudinal direction, thereby excellently reducing the ununiformity of the light intensity distribution of the laser beam L2 in the longitudinal direction.

The optical element 22 is an aspherical cylindrical lens. An aspherical surface is a curved surface that is not a spherical surface. The optical element 22, which is an aspherical cylindrical lens, can appropriately emit the laser beam L2 having a line shape while reducing the ununiformity of the light intensity distribution of the laser beam L2. The profile of a curved surface E of an aspherical lens is expressed as Expression (8) below, which is exemplary.

$$E = \frac{y^2}{r\left(\sqrt{1 - \frac{(k+1)y^2}{r^2}} + 1\right)} + \alpha_2 y^4 + \alpha_3 y^6 + \alpha_4 y^8 + \alpha_5 y^{10} \quad (8)$$

In Expression (8), y represents a direction, and $\alpha_2$, $\alpha_3$, $\alpha_4$, $\alpha_5$, and k are coefficients.

In this manner, the surface of the optical element 22 according to the present embodiment is continuous, differentiable, and smooth. Only one optical element 22 needs to be provided as an optical element for generating a laser beam having a line shape, and more precisely, only one optical surface (in the present embodiment, the entrance surface 30) for achieving the line shape is needed. Through the optical element 22, the laser beam L2 can have the length LY equal to or shorter than the length of the exit pupil in the direction Y. Accordingly, the optical element 22 can perform the top-hat conversion while taking influence of diffraction into account. The optical element 22, having smooth surface, does not generate unnecessary light, thereby preventing decrease of light use efficiency and generation of speckles. In addition, the optical element 22, having smooth surface, can have reduced sensitivity to the wavelength of light as compared to a DOE, which allows reduction of the scale of a manufacturing device. Accordingly, the optical element 22 can be easily manufactured. In addition, light from the optical element 22 is in the Fraunhofer region and thus unlikely to be affected by a flaw or a foreign object. In this manner, the optical element 22 solves the problem of a conventional Powell lens or aspherical lens and the problem of a DOE, and further has their advantages.

The optical element 22 is not limited to an aspherical cylindrical lens. For example, the optical element unit 12 does not include the collimating lens 20 in some cases. In this case, the optical element 22 is provided with a collimating function, specifically, a function of adjusting divergent light into parallel light. The optical element 22 has a toric shape in this case. The toric shape has curved surfaces in both of the direction X and the direction Y, the curvatures of which are different from each other. Accordingly, in this case, the optical element 22 is an aspherical toric lens. The optical element 22 as an aspherical toric lens can reduce the ununiformity of the light intensity distribution of the laser beam L2 while appropriately collimating the laser beam L2.

Figure 9:
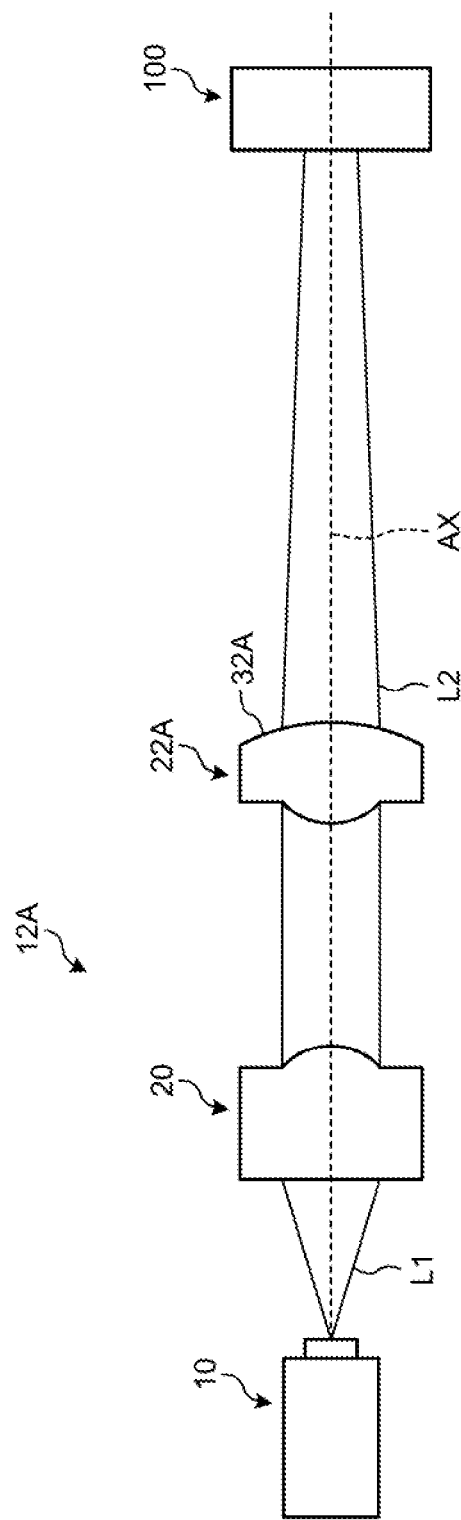
FIG. 9 is a schematic diagram illustrating another exemplary optical element unit.

FIG. 9 is a schematic diagram illustrating another exemplary optical element unit. The optical element unit can have a structure other than an example without the collimating lens 20. FIG. 9 illustrates a case in which the convergence lens 24 is not provided and an optical element 22A has a convergence function. An optical element unit 12A illustrated in FIG. 9 includes the collimating lens 20 and the optical element 22A. The optical element 22A receives, through the entrance surface 30, the laser beam L1 adjusted to parallel light through the collimating lens 20. The optical element 22A has an exit surface 32A that is not planar but is convex. Thus, the optical element 22A can converge the laser beam L2 provided with wavefront aberration through the exit surface 32A. Alternatively, the optical element 22 having no convergence function (the optical element 22 in which the exit surface 32 has a flat plate shape) may be used in a case where the convergence lens 24 is not provided. In this case, the laser beam L2 can be appropriately emitted to the focal position by converging the laser beam L1 emitted from the collimating lens 20. Thus, the optical element unit 12 may include the optical element 22 that provides wavefront aberration, and more preferably has a collimating function and a convergence function.

EXAMPLE

The following describes an example. The present example describes an exemplary wavefront profile when target values described below are satisfied and when wavefront aberration as in the present embodiment is provided in the direction Y and wavefront aberration equal to or smaller than the diffraction limit is provided in the X direction. In the present example, the wavelength of a laser beam is 532 nm, and a distance WD from the exit of the optical system to a position at which light having a line shape is generated is 40 mm. The target value of the length LX of the laser beam in the direction X at the focal position Pf is 10 µm, and the target value of the length LY of the laser beam in the direction Y at the focal position Pf is equal to or larger than 0.2 mm. The target value of the uniformity of illuminance distribution is equal to or smaller than 0.1%, and the target value of a coupling efficiency is equal to or larger than 50%. The coupling efficiency is the ratio of the amount of usable light relative to the output of a light source, but may be the ratio of the amount of usable light relative to the amount of light emitted from the optical element unit 12. These conditions are values at the $1/e^2$ width of the laser beam L2.

The divergence angle of a laser beam from the light source in the direction X is 10°, and the divergence angle of the laser beam in the direction Y is 5°. These divergence angles are values at full width at half maximum. The laser beam having such divergence angles is narrowed in the direction Y to achieve the target values as described above, thereby providing wavefront aberration as in the present embodiment.

In this case, the radius w(z) of the laser beam, except for the beam waist, at each position in the direction Z is given by Expression (9) below.

$$w(z) = \sqrt{w_1^2 + \left(\frac{\lambda z}{\pi w_1}\right)^2} \quad (9)$$

In the expression, z represents the distance of the beam waist in the optical axis AX, and $w_1$ represents the radius of the beam waist. In Expression (9), the radius w(z) at the exit pupil is approximately 1.35 mm when λ is 532 nm, $w_1$ is 5 µm, and z is 40 mm. Since the laser beam has a divergence angle of 10°, the focal length of the collimating lens 20 is approximately 9 mm. The collimating lens 20 has an effective radius $R_y$ of 2 mm.

In the present example, τ(y) as the profile of the wavefront (wavefront aberration) in this case is expressed with even-numbered powers as in Expression (10) below. The coefficient φ(y) of the wavefront phase is given by Expression (11) below.

$$\tau(y) = \sum_n a_{2n} Y^{2n} - Ry \leq y \leq Ry \quad (10)$$

$$\phi(y) = \exp i \cdot 2\pi \cdot \frac{\tau(y)}{\lambda} \quad (11)$$

Figure 10:
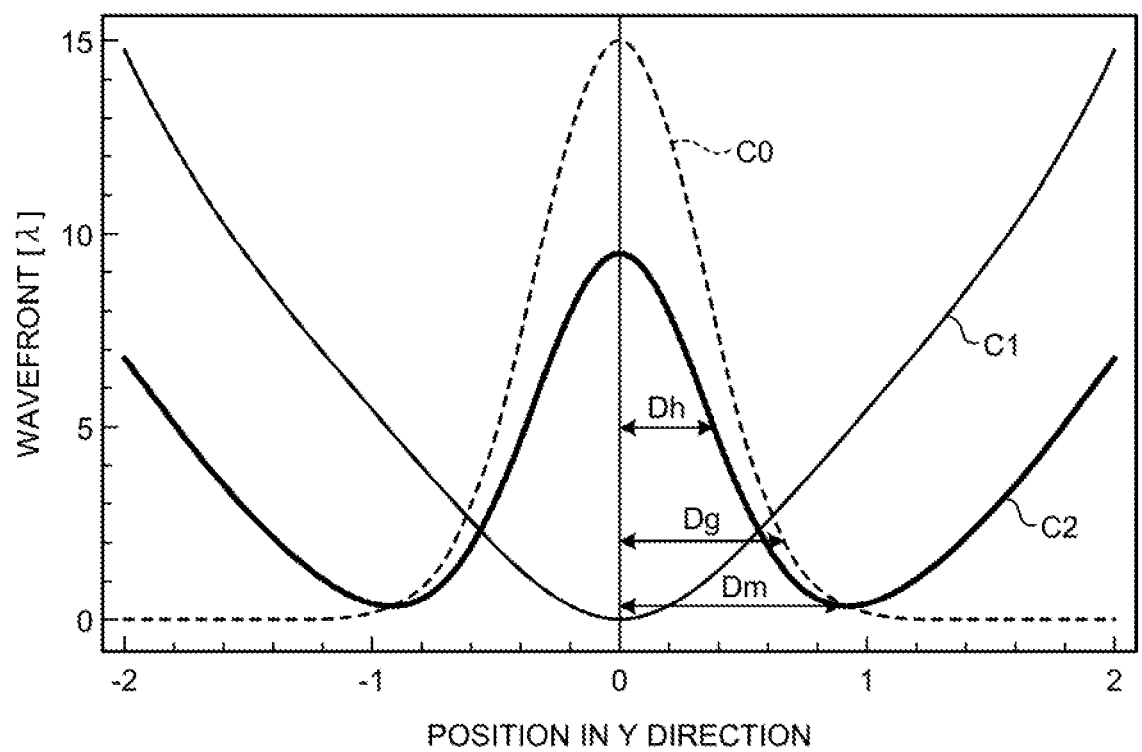
FIG. 10 is a graph illustrating the shape of a wavefront in an example.

FIG. 10 is a graph illustrating a wavefront shape in the example. As a result of non-linear optimization using these Expressions (10) and (11), the coefficient $a_{2n}$ of each power is as follows. Specifically, the coefficient $a_2$ is 8.79864, the coefficient $a_4$ is −5.86365, the coefficient $a_6$ is 3.78267, the coefficient $a_8$ is −1.62899, the coefficient $a_{10}$ is 0.436826, the coefficient $a_{12}$ is −0.0644682, and the coefficient $a_{14}$ is 0.00397361. In the present example, a wavefront having these coefficients and the curvature of the wavefront were calculated. The wavefront in the present example draws Curve C1 in FIG. 10, and the curvature of the wavefront draws Curve C2 in FIG. 10. Curve C1 in FIG. 10 represents the Gaussian distribution.

As illustrated with Curve C1 in FIG. 10, the wavefront profile in the present example has a shape similar to that of the profile illustrated with Curve A1 in FIG. 6. The difference between the minimum and maximum values of Curve C1 is approximately 15 times longer than the wavelength of the laser beam L2. As illustrated with Curve C2 in FIG. 10, the wavefront curvature profile in the present example has a shape similar to that of the profile illustrated with Curve A2 in FIG. 6. Length Dh is approximately 0.39 mm, and Length Dg is approximately 0.67 mm. Length Dm is approximately 0.872 mm.

In the example, since wavefront aberration having a curvature profile similar to that of Curve C2 is provided, the light intensity distribution in the Y direction is as illustrated in FIG. 7, which indicates reduction of the ununiformity of the light intensity distribution of the laser beam. In addition, the light intensity distribution in the X direction is as illustrated in FIG. 8. In the example, the length LX of the laser beam at the focal position Pf was calculated to be 10 µm, the length LY of the laser beam at the focal position Pf was calculated to be 2.8 mm, the uniformity was calculated to be 0.04%, and the coupling efficiency was calculated to be 60%. In this manner, the target values are satisfied in the example.

The embodiment of the present invention is described above but not limited to the content of the present embodiment. The above-described components include those easily thought of by the skilled person in the art, those identical in effect, and equivalents. The above-described components may be combined as appropriate. The components may be omitted, replaced, and changed in various kinds of manners without departing from the scope of the above-described embodiment.

REFERENCE SIGNS LIST 1 laser irradiation device
10 light source
12 optical element unit
20 collimating lens
22 optical element
24 convergence lens
30 entrance surface
32 exit surface
L1, L2, L3 laser beam

The invention claimed is:

1. An optical element that includes an entrance surface through which laser beam is incident and an exit surface and an exit surface through which the laser beam incident is emitted, wherein,
at least one of the entrance surface and the exit surface have a shape that satisfies an expression (1) such that;
when a laser beam having a light intensity distribution is entered from the entrance surface,
provide wavefront aberration of the received laser beam in a first direction orthogonal to a traveling direction larger than a diffraction limit, and provides wavefront aberration of the received laser beam in a second direction orthogonal to the traveling direction and the first direction equal to or smaller than the diffraction limit,
and narrows the laser beam emitted from the exit surface in both of the first direction and the second direction, and
the wavefront aberration of the laser beam in the first direction has a curvature profile, a curvature of which has a local maximum value at a first position and has, at a second position and a third position, values smaller than the local maximum value at the first position, $$z = \tau(y)/(1-n) \tag{1}$$

wherein,
z represents the surface coordinate of the at least one of the entrance surface and the exit surface in the traveling direction,
$\tau(y)$ represents the wavefront of the laser beam at a position y in the first direction, and
n represents the refractive index of the optical element at the wavelength of the laser beam, and
the first position is a position between the second position and the third position in the first direction and is a position closer to the optical axis of the laser beam than the second position and the third position.

2. The optical element according to claim 1, wherein a difference between maximum and minimum values of the wavefront aberration in the first direction is equal to or larger than a wavelength of the laser beam.

3. The optical element according to claim 1, wherein the wavefront aberration of the laser beam in the first direction has a profile continuous in the first direction.

4. The optical element according to claim 1 configured to emit the laser beam, a length of which in the first direction is shorter than a length of the optical element in the first direction.

5. The optical element according to claim 1 that is an aspherical cylindrical lens or an aspherical toric lens.

6. A laser irradiation device comprising:
the optical element according to claim 1; and
a light source configured to emit the laser beam to the optical element.

* * * * *